United States Patent [19]

Spaulding

[11] Patent Number: 4,730,110

[45] Date of Patent: Mar. 8, 1988

[54] SHAFT POSITION ENCODER

[75] Inventor: Carl P. Spaulding, Duarte, Calif.

[73] Assignee: Spaulding Instruments, Duarte, Calif.

[21] Appl. No.: 906,421

[22] Filed: Sep. 11, 1986

Related U.S. Application Data

[63] Continuation-in-part of Ser. No. 634,880, Jul. 27, 1984, abandoned.

[51] Int. Cl.$^4$ ............................................. G01D 5/34
[52] U.S. Cl. ............................ 250/231 SE; 340/347 P
[58] Field of Search .................... 250/231 SE, 237 G; 340/347 P; 356/395; 324/175

[56] References Cited

U.S. PATENT DOCUMENTS 3,808,431  4/1974  Hedrick .................... 250/231 SE
4,422,065  12/1983  Radomirov .................... 340/347 P

OTHER PUBLICATIONS pp. 37–39 of monograph How to Use Shaft Encoders, by Carl P. Spaulding, published by Datex Corporation, a subsidiary of Giannini Controls Corporation, Monrovia, Calif. (copyrighted 1965).

Primary Examiner—Edward P. Westin
Assistant Examiner—Charles Wieland
Attorney, Agent, or Firm—Christie, Parker & Hale

[57] ABSTRACT

A multi-turn shaft position encoder employs a plurality of encoder discs with successive speed reductions of $1:2^n$ and the generation of $n+1$ bits of binary data representative of the angular position of the respective discs as the input shaft rotates. Specifically, a high-speed disc is coupled to an input shaft and low-speed disc means is coupled to the input shaft with a speed reduction of $1:2^n$ relative to the high-speed disc. At least one group of $n+1$ bits of binary data representative of the angular position of the high-speed disc are generated as the input shaft rotates. A group of $n+1$ bits of data representative of the angular position of the low-speed disc means is generated as the input shaft rotates. Thus, the low-speed disc is divided in to $2^n$ units per revolution but produces $2^{n+1}$ bits of data. The data is generated by the encoder in unit distance code and is then converted into fewer bits of data in natural binary code. The encoder has a high-speed disc in connection with which two groups of data bits are generated, one being shifted relative to the other. In addition, there is cumulative bit shifting from disc to disc. The $n+1^{st}$ bit is generated on the same track of each encoder disc as the $n^{th}$ bit by placing the corresponding data bit-generating sensors at angularly spaced apart positions relative to the same track.

25 Claims, 12 Drawing Figures

SHAFT POSITION ENCODER

CROSS-REFERENCE TO RELATED APPLICATIONS

This is a continuation-in-part of application Ser. No. 634,880 filed July 27, 1984, now abandoned.

BACKGROUND OF THE INVENTION

This invention relates to transducers and, more particularly, to a multi-turn, binary shaft position encoder.

Shaft position encoders have many industrial uses. One such use is to generate electrical signals representative of the position of a workpiece in automatic machine-tool control. Accuracy, reliability, compactness, and cost are the factors upon which a systems engineer selects a shaft position encoder. These characteristics are therefore essential considerations in the design of a shaft position encoder.

To generate electrical signals representative of a large number of shaft positions, multi-turn encoders are utilized. A multi-turn encoder has a plurality of coded discs geared together to rotate at different related speeds. In my monograph entitled "How to Use Shaft Encoders," Datex Corporation, 1965, pp. 37–39, the problem of the ambiguity introduced by the gearing of multi-turn encoders is discussed. In this connection, there is a brief description of an approach that employs a redundant or overlapping bit on the low-speed encoder to resolve ambiguity. To my knowledge, this method has never been fully developed or used in any commercial encoders.

SUMMARY OF THE INVENTION

According to the invention, a multi-turn shaft position encoder employs redundant or overlapping bits to resolve ambiguity.

One feature of the invention is the use of encoder discs with successive speed reductions of $1:2^n$ and the generation of $n+1$ bits of binary data representative of the angular position of the respective discs as the input shaft rotates, where n is greater than one. Specifically, a high-speed disc is coupled to an input shaft and low-speed disc means is coupled to the input shaft with a speed reduction of $1:2^n$ relative to the high-speed disc. At least one group of $n+1$ bits of binary data representative of the angular position of the high-speed disc are generated as the input shaft rotates. A group of $n+1$ bits of data representative of the angular position of the low-speed disc means is generated as the input shaft rotates. Thus, the low-speed disc is divided in to $2^n$ units per revolution but produces $2^{n+1}$ bits of data.

Another feature of the invention is the conversion of the data generated by a shaft position encoder in unit distance code into fewer bits of data in natural binary code. Specifically, a plurality of m discs are coupled to an input shaft with successive speed reduction. At least m groups of $n+1$ bits of binary data representative of the angular positions of the respective discs in unit distance code are generated as the input shaft rotates, where the number of groups is greater than two. The generated data is converted into $m \cdot n+1$ bits of data in natural binary code.

Another feature of the invention is the use of a high-speed disc in connection with which two or three groups of data bits are generated, one being shifted relative to the other. Specifically, a high-speed disc is coupled to an input shaft and low-speed disc means are coupled to the input shaft with a speed reduction relative to the high-speed disc. A first group of $n+1$ bits of binary data representative of the angular position of the high-speed disc are generated as the input shaft rotates. The scale of the first group is $\frac{1}{2}^n$ of a revolution of the high-speed disc divided into $2^{n+1}$ units. A second group of $n+1$ bits of data representative of the angular position of the high-speed disc is generated as the input shaft rotates. The scale of the second group is one revolution of the high-speed disc divided into $2^n$ units. Preferably, the $n+1^{st}$ bit of each group is shifted one-quarter of scale relative to the $n^{th}$ bit and the n bits of the second group are shifted the same amount as the $n+1^{st}$ bit of the first group.

Another feature of the invention is cumulative bit shifting from disc to disc. Specifically, a high-speed disc is coupled to an input shaft. First and second low-speed disc means are also coupled to the input shaft with successive speed reductions. At least one group of $n+1$ bits of binary data in a scale representative of the angular position of the high-speed disc are generated as the input shaft rotates. A group of $n+1$ bits of data in a succeeding scale representative of the angular position of the first low-speed disc means are generated as the input shaft rotates. A group of $n+1$ bits of data in a succeeding scale representative of the angular position of the second low-speed disc means are generated as the input shaft rotates. Each group of bits of data comprises n bits of data representative of input shaft position in unit distance code sequence and an $n+1^{st}$ bit shifted a fraction of scale relative to the $n^{th}$ bit. The $n+1^{st}$ bit of each scale and the n bits of the succeeding scale are shifted the same amount so that bit shifting is cumulative from scale to scale.

Another feature of the invention is the generation of the $n+1^{st}$ bit on the same track of the encoder disc as the $n^{th}$ bit by placing the corresponding data bit-generating sensors at angularly spaced apart positions relative to the same track.

The foregoing features utilized collectively or selectively permit an accurate, reliable, compact shaft position encoder to be manufactured at low cost. The result is that position shaft encoders can be made competitive with resolvers as a shaft position transducer.

BRIEF DESCRIPTION OF THE DRAWINGS

The features of specific embodiments of the best mode contemplated of carrying out the invention are illustrated in the drawings, in which:

FIG. 7 is a diagram showing the relationship between the electrical signals generated by the encoder of FIG.

1 and the shaft positions expressed in natural binary code;

DETAILED DESCRIPTION OF THE SPECIFIC EMBODIMENTS

Figure 1:
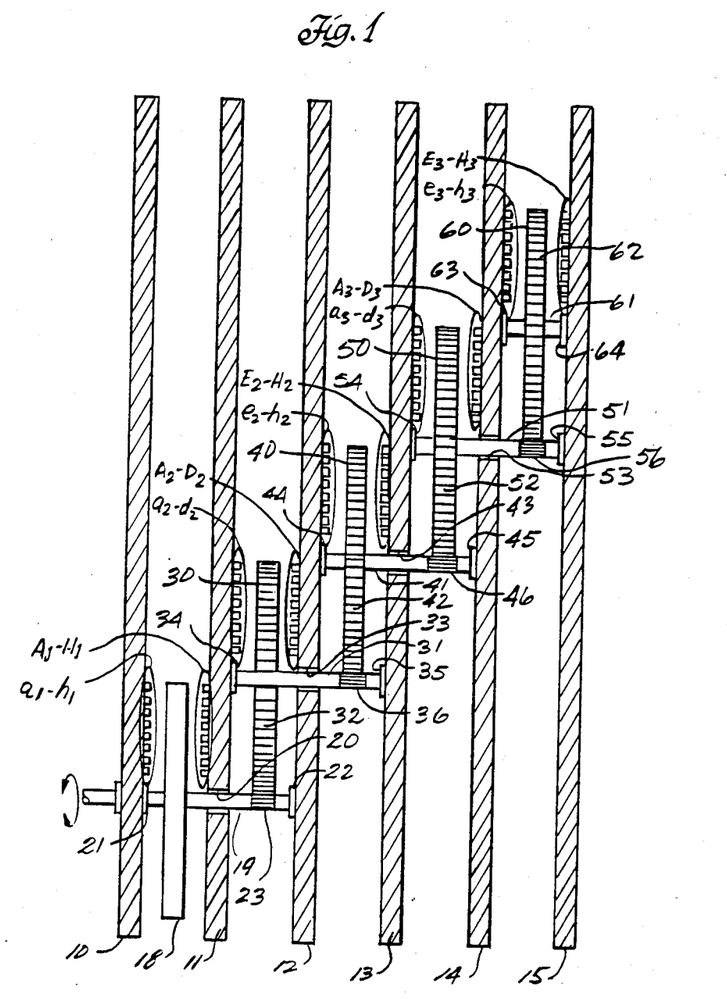
FIG. 1 is a schematic side view of a shaft position encoder incorporating principles of the invention.

In FIG. 1, a shaft position encoder has component mounting boards 10, 11, 12, 13, 14, and 15 supported in spaced apart, parallel relationship by spacers not shown.

A high-speed coded disc 18 is mounted on an input shaft 19 between boards 10 and 11. Shaft 19 extends through an opening 20 in board 11 and is rotatably supported on boards 10 and 12 by bearings 21 and 22, respectively. Light sources $a_1$ through $h_1$, which could be for example, light-emitting diodes, are mounted on the surface of board 10 facing toward disc 18. Light detectors $A_1$ through $H_1$, which could be for example, phototransistors, are mounted on the surface of board 11 facing toward disc 18 in alignment with sources $a_1$ through $h_1$, respectively. Disc 18 has six slotted tracks through which light is selectively coupled between the light source-sensor pairs depending upon the angular position of disc 18. Shaft 19 or at least a portion thereof, has a plurality (e.g., ten) of gear teeth 23.

A low-speed coded disc 30 is mounted on a shaft 31 between boards 11 and 12. The periphery of disc 30 has a plurality (e.g., eighty) of gear teeth 32 that engage gear teeth 23 on shaft 19 to produce a speed reduction of 1:8 relative to disc 18. Shaft 31 extends through an opening 33 in board 12 and is rotatably supported on boards 11 and 13 by bearings 34 and 35, respectively. Light sources $a_2$ through $d_2$ are mounted on the surface of board 11 facing toward disc 30. Light detectors $A_2$ through $D_2$ are mounted on the surface of board 12 facing toward disc 30 in alignment with light sources $a_1$ through $d_1$, respectively. Disc 30 has three slotted tracks through which light is selectively coupled between the light source-sensor pairs, depending upon the angular position of disc 30. Shaft 31, or at least a portion thereof, has a plurality (e.g., ten) of gear teeth 36.

A low-speed coded disc 40 is mounted on a shaft 41 between boards 12 and 13. The periphery of disc 40 has a plurality (e.g., eighty) gear teeth 42 that engage gear teeth 36 on shaft 31 to produce a speed reduction of 1:8 relative to disc 30. Shaft 41 extends through an opening 43 in board 13 and is rotatably supported on boards 12 and 14 by bearings 44 and 45, respectively. Light sources $e_2$ through $h_2$ are mounted on the surface of board 12 facing toward disc 40. Light detectors $E_2$ through $H_2$ are mounted on the surface of board 13 facing toward disc 40 in alignment with sources $e_2$ through $h_2$, respectively. Disc 40 has three slotted tracks through which light is selectively coupled between the light source-sensor pairs, depending upon the angular position of disc 40. Shaft 41, or at least a portion thereof, has a plurality (e.g., ten) of gear teeth 46.

A low-speed coded disc 50 is mounted on a shaft 51 between boards 13 and 14. The periphery of disc 50 has a plurality (e.g., eighty) gear teeth 52 that engage gear teeth 46 on shaft 41 to produce a speed reduction of 1:8 relative to disc 40. Shaft 51 extends through an opening 53 in board 14 and is rotatably supported on boards 13 and 15 by bearings 54 and 55, respectively. Light sources $a_3$ through $d_3$ are mounted on the surface of board 13 facing toward disc 50. Light detectors $A_3$ through $D_3$ are mounted on the surface of board 14 facing toward disc 50 in alignment with sources $a_3$ through $d_3$, respectively. Disc 50 has three slotted tracks through which light is selectively coupled between the light source-sensor pairs, depending upon the angular position of the disc 50. Shaft 51, or at least a portion thereof, has a plurality (e.g., ten) of gear teeth 56.

A low-speed coded disc 60 is mounted on a shaft 61 between boards 14 and 15. The periphery of disc 60 has a plurality (e.g., eighty) gear teeth 62 that engage gear teeth 56 on shaft 51 to produce a speed reduction of 1:8 relative to disc 50. Shaft 61 is rotatably supported on boards 14 and 15 by bearings 63 and 64, respectively. Light sources $e_3$ through $h_3$ are mounted on the surface of board 14 facing toward disc 60. Light detectors $E_3$ through $H_3$ are mounted on the surface of board 15 facing toward disc 60 in alignment with sources $e_3$ through $h_3$, respectively. Disc 60 has three slotted tracks through which light is selectively coupled between the light source-sensor pairs, depending upon the angular position of disc 60.

Figure 6:
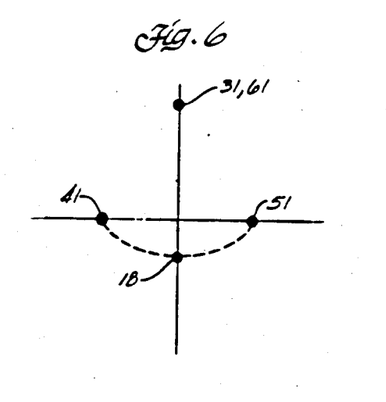
FIG. 6 is a schematic diagram showing the preferred axial arrangement of the disc shafts of the encoder of FIG. 1.

To facilitate illustration, the components of the encoder are shown two-dimensionally in FIG. 1. In the preferred embodiment, shafts 19, 31, 41, 51, and 61 do not lie in the same plane. To obtain a more compact construction, the shafts are arranged as illustrated in FIG. 6, which diagrammatically shows the axes of the shafts as points in a plane perpendicular to FIG. 1. Shafts 31, 41, and 51 lie at the corners of an imaginary equilateral triangle. Shaft 61 is axially aligned with shaft 31. (If the encoder were expanded to include more low-speed discs, the next low-speed disc would be mounted on a shaft axially aligned with shaft 41, etc.) The axis of shaft 18 lies midway between shafts 41 and 51 on an arc having a center at the axis of shaft 31 and the same radius as shafts 41 and 51 with respect to such center. Likewise, the light sources and sensors do not all lie in the plane of FIG. 1. Instead, they are arranged at selected angular positions about the shafts as indicated in FIGS. 2, 3, and 4.

Input shaft 19 could be either directly coupled to the shaft whose position is to be encoded or to such shaft through gearing that provides any desired gear ratio.

Ordinarily, the shaft encoder would have a housing not shown, and boards 10, 11, 12, 13, 14, and 15 would have printed circuitry thereon to provide the necessary electrical connections to data buses A through H referred to below in connection with FIG. 5.

Figure 2:
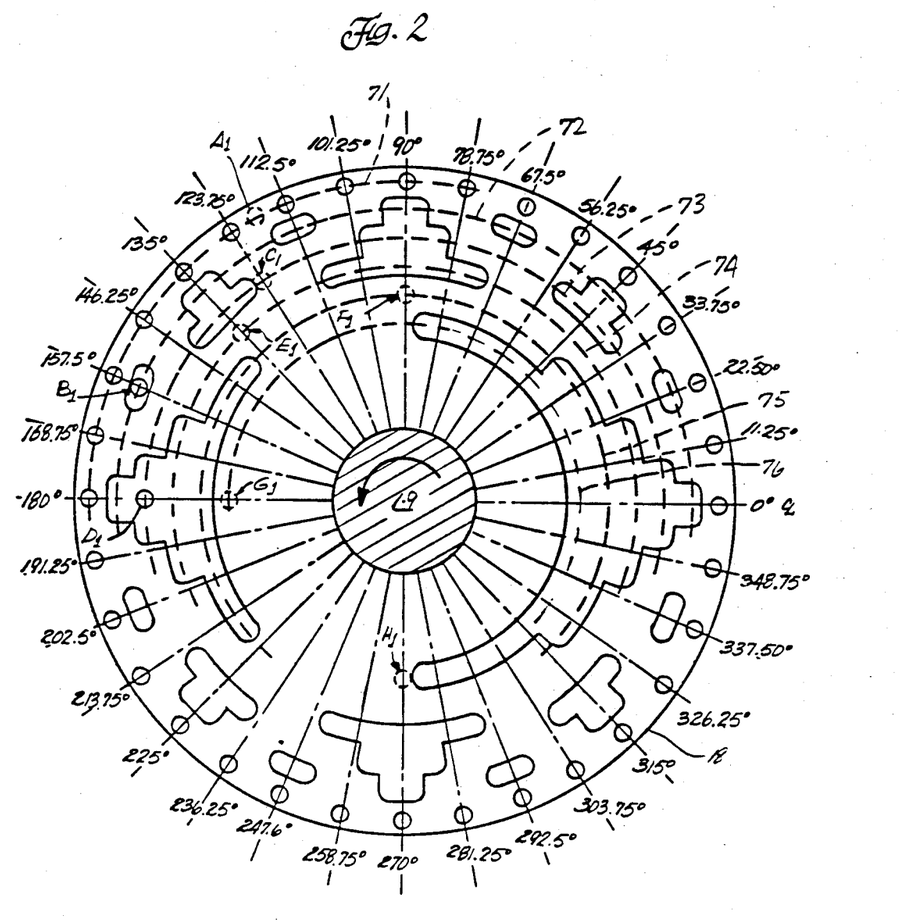
FIG. 2 is an end view of the high-speed disc of the encoder of FIG. 1.

As shown in FIG. 2, high-speed disc 18 has two groups of three tracks each for a total of six concentric tracks, namely tracks 71, 72, 73, 74, 75, and 76. Track 71 has thirty-two slotted openings distributed around disc 18 at intervals of 11.25°. The nominal width of these openings is one-half of the spacing therebetween, i.e., 5.625°. (As explained below, the actual width of these and the rest of the slotted openings is somewhat less.) Light sensor $A_1$ and its corresponding light source $a_1$ are aligned with track 71 at the angular position shown in FIG. 2 relative to a reference shaft position. Track 72 has sixteen slotted openings distributed around disc 18 at intervals of $22\frac{1}{2}°$. The nominal width of these openings is one-half of the spacing therebetween, i.e., 11.25°. Light sensor $B_1$ and its corresponding light source $b_1$ are aligned with track 72 at the angular position shown in FIG. 2 relative to the reference shaft position. Track 73 has eight slotted openings distributed around disc 18 at intervals of 45°. The nominal width is one-half of the spacing therebetween, i.e., 22.5°. Light sensors $C_1$ and $D_1$ and their corresponding light sources $c_1$ and $d_1$, respectively, are aligned with track 73 at the angular positions shown in FIG. 2 relative to the reference shaft position. Sensor $D_1$ is shifted 11.25° with respect to sensor $C_1$. Track 74 has four slotted openings distributed around disc 18 at intervals of 90°. The nominal width of these openings is one-half of the spacing therebetween, i.e., 45°. Light sensor $E_1$ and its corresponding light source $e_1$ are aligned with track 74 at the angular position shown in FIG. 2 relative to the reference shaft position. Track 75 has two slotted openings distributed around disc 18 at intervals of 180°. The nominal width of these openings is one-half of the spacing therebetween, i.e., 90°. Light sensor $F_1$ and its corresponding light source $f_1$ are aligned with track 75 at the angular position shown in FIG. 2 relative to the reference shaft position. Track 76 has a single slotted opening, the nominal width of which is 180°. Light sensors $G_1$ and $H_1$ and their corresponding light sources $g_1$ and $h_1$, are aligned with track 76 at the angular positions shown in FIG. 2 relative to the reference shaft position. Sensor $H_1$ is shifted 90° with respect to sensor $G_1$. One slotted opening of each of tracks 70 through 75 is aligned with the slotted opening of track 76.

Figure 3A:
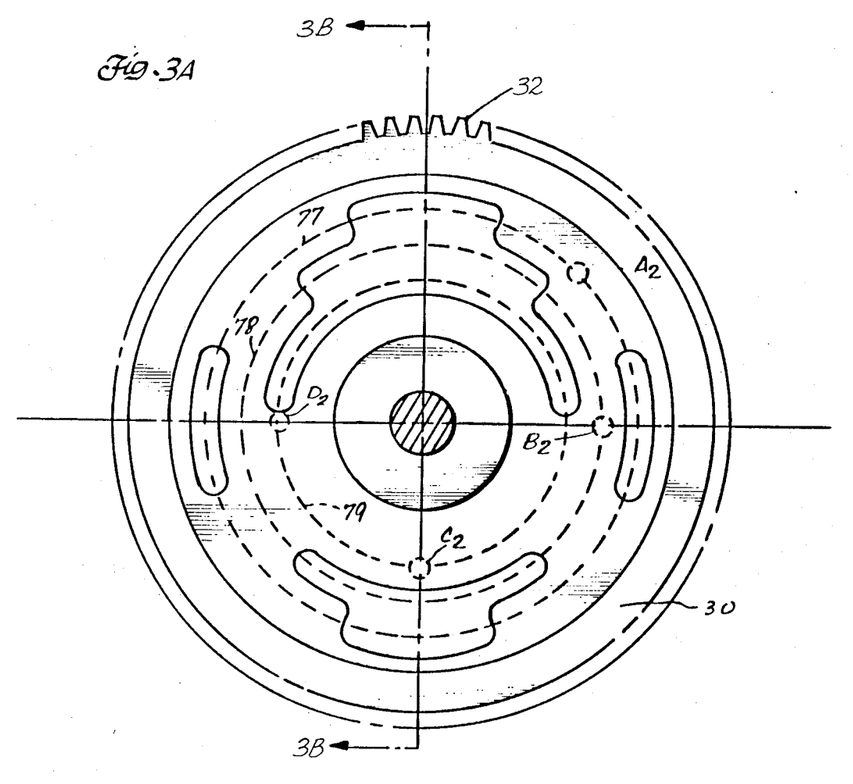
FIG. 3A is an end view and FIG. 3B is a side-sectional view of one of the low-speed discs of the encoder of FIG. 1.
Figure 4:
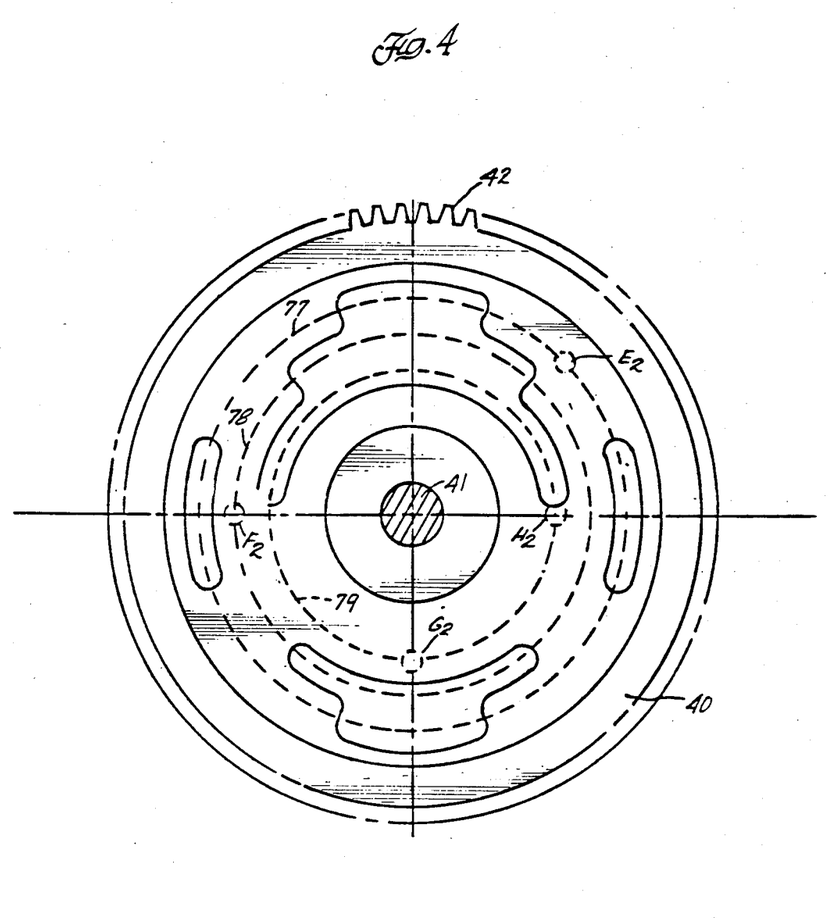
FIG. 4 is an end view of another low-speed disc of the encoder of FIG. 1, this disc appearing in side section as shown in FIG. 3B.

FIGS. 3A and 4 illustrate low-speed discs 30 and 50, respectively, the only difference therebetween being the location of the light source-sensor pairs. Each low-speed disc has three concentric tracks, namely tracks 77, 78, and 79. Track 77 has four slotted openings distributed around the disc at intervals of 90°. The nominal width of these openings is one-half of the spacing therebetween, i.e., 45°. Light sensor $A_2$ and its corresponding light source $a_2$ are aligned with track 77 at the annular position shown in FIG. 3A relative to the reference shaft position. Track 78 has two slotted openings distributed around the disc at intervals of 180°. The nominal width of these openings is one-half of the spacing therebetween, i.e., 90°. Light sensor $B_2$ and its corresponding light source $b_2$ are aligned with track 78 at the angular position shown in FIG. 3A relative to the reference shaft position. Track 79 has a single slotted opening, the nominal width of which is 180°. Light sensors $C_2$ and $D_2$ and their corresponding light sources $c_2$ and $d_2$, respectively, are aligned with track 78 at the angular positions shown in FIG. 3A relative to the reference shaft position. Sensor $D_2$ is shifted 90° with respect to sensor $C_2$. Light sensors $E_2$, $F_2$, $G_2$, and $H_2$ and their corresponding light sources $e_2$, $f_2$, $g_2$, and $h_2$, respectively, are aligned with tracks 77, 78, and 79 of disc 40 at the angular positions shown in FIG. 4, relative to the zero shaft position. Sensor $H_2$ is shifted 90° with respect to sensor $G_2$. The slotted openings of each track form alternate sectors that are transparent and opaque to light transmission from the light sources to the light sensors.

Low-speed disc 50 is identical to low-speed disc 30 and the corresponding light source-sensor pairs are arranged as shown in FIG. 3A. Low-speed disc 60 is identical to low-speed disc 40 and the light source-sensor pairs are arranged as shown in FIG. 4.

Figure 7:
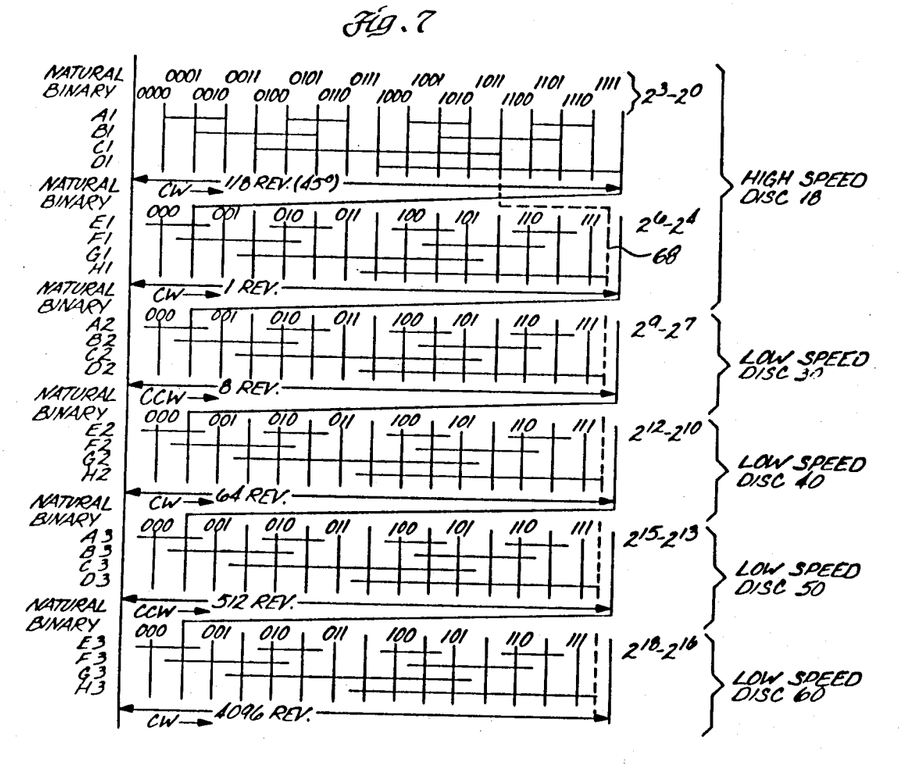

In FIG. 7, a line 68 represents the positions of the light source-sensor pairs relative to each other and the reference shaft position.

Figure 3B:
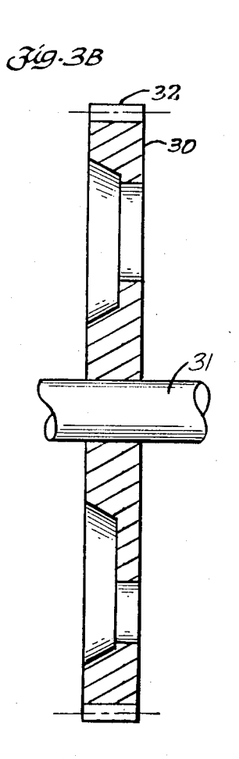

As depicted in FIG. 3B, low-speed disc 30 has a thickened outer periphery on which gear teeth 32 are formed, a thickened inner hub for mounting on shaft 31 and a thin intermediate portion in which the slotted openings are formed. This construction, which is also used for discs 40, 50, and 60 minimizes mass and maximizes strength, and also minimizes the spacing between the light sources and sensors.

To account for the thickness of the light beam coupled between the light source-sensor pairs, the width of the slotted openings is less than the nominal width by an amount equal to the beam width, i.e., the beam diameter, of the light sources. Preferably, the beam is narrowed by placement of a slitted plate in the beam path between each light source and sensor. In this way, the beam width can be narrowed, which permits increased resolution. With a light source beam diameter of the order 0.030 inch, the slit typically permits narrowing of the beam width to a value of the order of 0.004 inch to 0.008 inch. This expedient permits the light sensors to generate an output signal precisely at the transition from one shaft position to the other, i.e., when the leading edge of the light beam begins to pass through the slotted opening.

Figure 5:
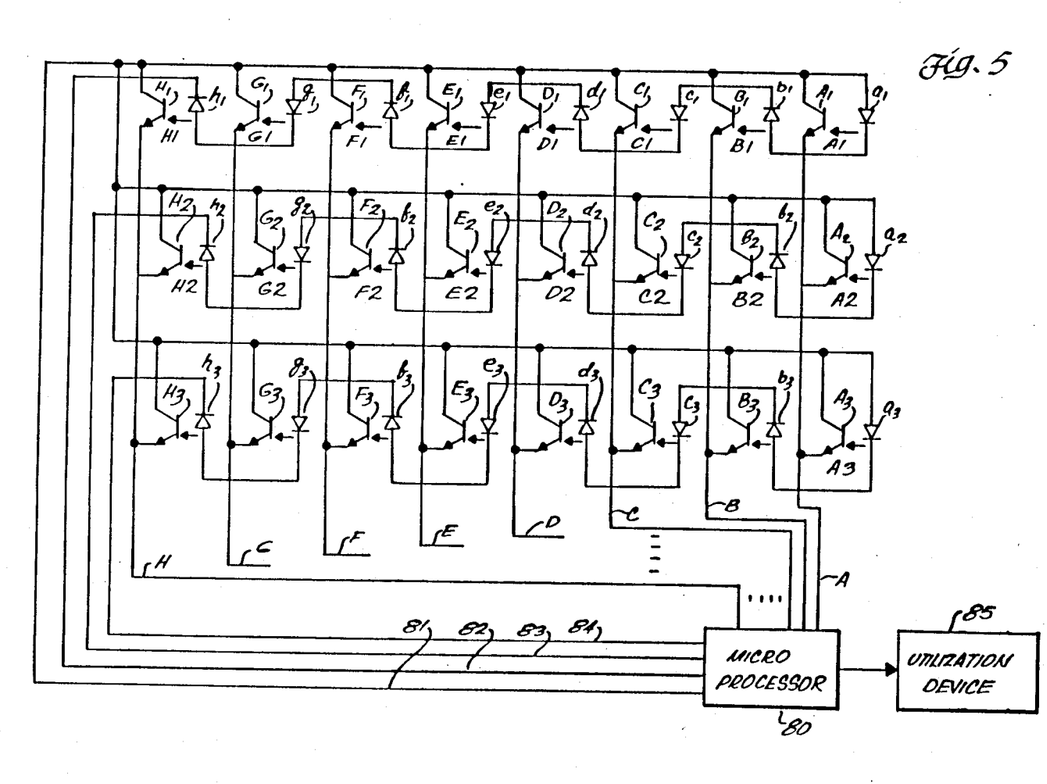
FIG. 5 is a schematic diagram of the electrical signal generating and processing circuitry associated with the encoder of FIG. 1.

In FIG. 5, the light source-sensor pairs are shown connected to a microprocessor 80 by data buses A through H. Light sources (light-emitting diodes) $a_1$ through $h_1$ are connected in series between a d.c. power bus 81 and a first decoded address line 82 from microprocessor 80. Light sources $a_2$ through $h_2$ are connected in series between power bus 81 and a second decoded address line 83 from microprocessor 80. Light sources $a_3$ through $h_3$ are connected in series between power bus 81 and a third decoded address line 84 from microprocessor 80. Light sensors (phototransistors) $A_1$ through $H_1$, $A_2$ through $H_2$, and $A_3$ through $H_3$ are individually connected between power bus 81 and corresponding data buses A through H—i.e., sensors $A_1$, $A_2$, and $A_3$ are connected to data bus A, etc. Address buses 82, 83, and 84 are sequentially grounded by microprocessor 80 to sample the light sensors periodically at a rate determined by microprocessor 80. Specifically, during each sampling period, twenty-four bits of data representative of the shaft position during that sampling period are transferred from the twenty-four light sensors to microprocessor 80, eight bits at a time, by data buses A through H. As described in more detail below, microprocessor 80, converts the twenty-four bits of data in unit distance code, i.e., Gray code, to nineteen bits of data in natural binary code for use by a utilization device 85.

Depending upon the voltage of power supply bus 81, other configurations for connecting the light sources (light-emitting diodes) may be utilized combining parallel and series connection. For example, four sources could be connected in series with each other and each group of four connected in parallel, or two sources could be connected in series and each group of two connected in parallel, etc.

FIG. 7 illustrates the relationship between the coded electrical signals produced by the light sensors, i.e., the data generated by the encoder, and the shaft positions expressed in natural binary code reading from left to right on each scale with increasing shaft displacement from zero. There are nineteen bits of natural binary code corresponding to 524,288 different shaft positions each occupying a quantum of 2.8125° of the input shaft as represented by the vertical lines in FIG. 7. The encoder generates twenty-four bits of data in unit distance code, specifically Gray code, as represented by A1 through H1, A2 through H2, and A3 through H3 in FIG. 7 and the corresponding horizontal lines passing selectively through the quanta of shaft positions. Adjacent discs rotate in opposite directions as the input shaft position changes in one direction. In FIG. 7, "CW" represents clockwise disc rotation with increasing shaft displacement from zero and "CCW" represents counter-clockwise disc rotations. On disc 18, there are two scales—one scale is one-eighth of a revolution relative to the input shaft divided into sixteen units and the other scale is one revolution relative to the input shaft divided into eight units. On disc 30, the scale is eight revolutions relative to the input shaft divided into eight units. On disc 40, the scale is sixty-four revolutions relative to the input shaft divided into eight units. On disc 50, the scale is five hundred twelve revolutions relative to the input shaft divided into eight units. On disc 60, the scale is four thousand ninety-six revolutions relative to the input shaft divided into eight units.

It should be noted in FIG. 7 that the data bits are arranged in groups of $n+1$ bits, where $n=3$, e.g., A1 through D1. Each group has n bits that follow a Gray code sequence, e.g., A1, B1, and C1, and an $n+1^{th}$ bit that is shifted one-quarter of scale relative to the $n^{th}$ bit, e.g., D1; there are n slotted tracks on each disc and $n+1$ associated source-sensor pairs. The first group of $n+1$ bits (A1 through D1) represents $2^{n+1}$ disc positions. Each other group of $n+1$ bits (E1 through H1, A2 through D2, etc.) represents $2^n$ disc positions. The first two groups are both generated by tracks on the high-speed disc and associated source-sensor pairs. Each other group is generated by tracks on one of the low-speed discs and associated source-sensor pairs. The discs are geared to each other for successive $1:2^n$ speed reductions relative to the preceding disc beginning with the high-speed disc. The $n+1^{st}$ bit of each group of bits, e.g., D1, also functions as the first bit of the Gray code sequence of the following group of bits, e.g., E1 through G1. (The $n+1^{st}$ bit, however, is the compliment of what it would be in the normal Gray code sequence.) The latter (e.g., E1 through G1) are also shifted one-quarter of the scale of the preceding group of bits (e.g., A1 through C1), which is one-quarter of a unit of the following group of bits (e.g., E1 through G1).

Figure 8:
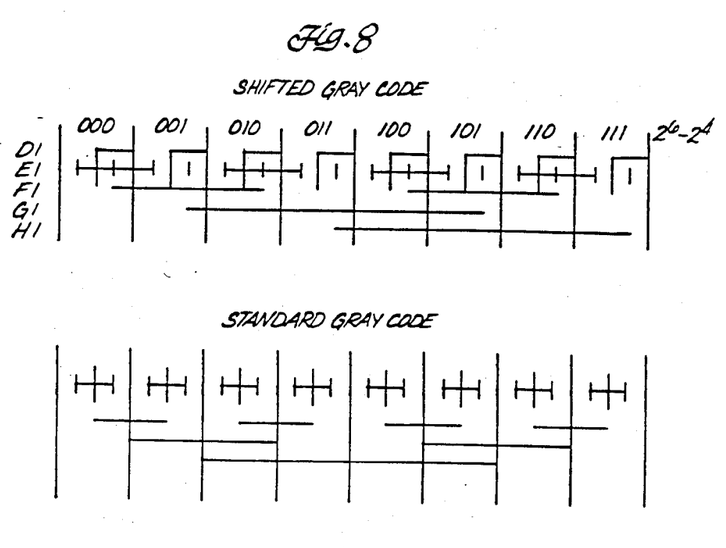
FIG. 8 is a diagram showing the relationship between the shifted data bits of the high-speed disc and a standard Gray code sequence.

As illustrated by FIG. 8 which compares a standard Gray code with the shifted Gray code represented by bits D1 through H1, bit D1 is shifted one-quarter of scale (one-quarter of a unit of bits E1 through G1) to the right relative to standard Gray code and bits E1 through H1 are shifted one-quarter of a unit to the left, relative to standard Gray code. In addition, bit H1 is shifted one-quarter of scale (one-quarter of a unit of bits A2 through D2) relative to bit G1 as discussed in the preceding paragraph. Similarly, bits A2 through D2 are shifted one-quarter of a unit to form a Gray code sequence with bit H1. In addition bit D2 is shifted one-quarter of scale (one-quarter of a unit of bits E2 through H2) relative to bit C2. The same pattern is followed with respect to discs 40, 50, and 60, with the shift from disc to disc being cumulative. The effect is that, except for the smallest scale (e.g., one-eight revolution), the units of the other scales are divided into four subunits by the data generated by the encoder, i.e., a total of thirty-two subunits per scale. The thirty-two subunits are represented by five bits, the $n+1$ bits of the corresponding group plus the $n+1^{st}$ bit of the previous group, e.g., D1, E1, F1, G1, H1, or H1, A2 B2, C2, D2. Thus, except for bit H3, the other shifted bits each function to represent units or subunits on two scales. By dividing each of the units into four subunits, the ambiguity caused by the gearing is resolved and the accuracy improved. The data generated by the encoder reflects in which of the four subunits the shaft is positioned.

As represented in FIG. 7, the encoder of FIG. 1 generates twenty-four bits of data representing 16,777,216 different subunits and 524,288 different shaft positions are represented by 19-bit binary shaft position signals in natural binary code. The 16,777,216 different signals generated by the encoder and the 524,288 different shaft position signals are linked by a look-up table in microprocessor 80. Specifically, three read-only memory (ROM) units could be used to perform the lookup function. In the first ROM, which corresponds to disc 18, seven-bit segments of natural binary output code are stored in 256 address locations selected by bits A1 through H1. In the second ROM, which corresponds to discs 30 and 40, six-bit segments of natural binary code are stored in 512 addresses selected by the most significant bit of the output from the first ROM and bits A2 through H2. In the third ROM, which corresponds to discs 50 and 60, six-bit segments of natural binary code are stored in 512 addresses selected by the most significant bit of the output of the second ROM and bits A3 through H3. Thus, the 19-bit binary shaft position signals in natural binary code are produced in three sequential lookup steps. The shaft position signals are coupled at the sampling rate directly to utilization device 85 or are used in the microprocessor with other feedback data and stored instructions to generate signals to control utilization device 85. By way of example, the shaft position encoder could be employed at part of an automatic machine tool control system in the manner described in my U.S. Pat. No. 4,242,621, which issued Dec. 30, 1980.

The following features not disclosed in my above-referenced monograph should be noted:

(1) there are fewer tracks on each disc than source-sensor pairs;

(2) the number of bits generated in connection with each low-speed disc, i.e., $n+1$, is one more than the exponent of the speed reduction to a base 2, i.e., $1:2^n$;

(3) shifted bits are used on the high-speed disc;

(4) the shifted bit in each group of bits is generated by positioning the corresponding source-sensor pair, e.g., $D_1$ and $d_1$, on the same track as the preceding source-sensor pair in the code sequence, e.g., $C_1$ and $c_1$;

(5) the bit shifting is cumulative from scale to scale, i.e., the bits generated by disc 30 are shifted relative to those generated by disc 18 and the bits generated by disc 40 are shifted relative to those generated by disc 30 etc.; and (6) the number of bits generated by the encoder is reduced prior to utilization of the shaft representative data.

Figure 9:
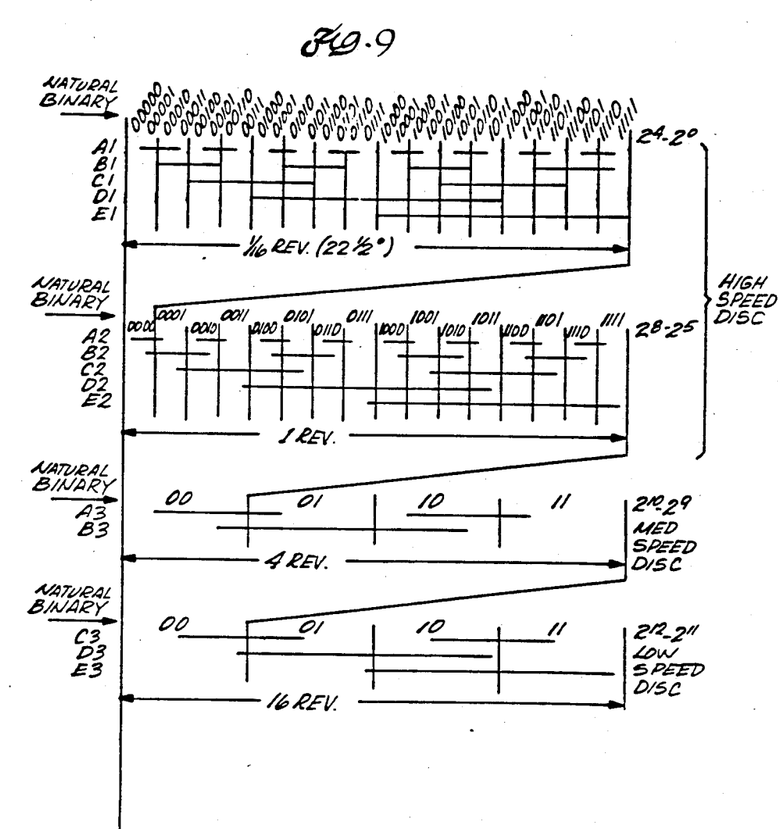
FIG. 9 is a diagram showing the relationship between the electrical signals generated by another embodiment of an encoder incorporating principles of the invention and the shaft positions expressed in natural binary code.

FIG. 9 represents another embodiment of an encoder incorporating principles of the invention. This encoder has a high-speed disc, a medium-speed disc, and a low-speed disc. On the high-speed disc there are two scales—one scale is one-sixteenth of a revolution relative to the input shaft divided into thirty-two units and the other scale is one revolution relative to the input shaft divided into sixteen units. On the medium-speed disc, the scale is four revolutions relative to the input shaft divided into four units. On the low-speed disc, the scale is sixteen revolutions relative to the input shaft divided into four units. Corresponding to each scale, the data bits are arranged in groups of n+1 bits, where n=4, e.g., A1 through E1. Each group has n bits that follow a Gray code sequence, e.g., A1 through D1 and an n+1$^{th}$ bit that is shifted one-quarter of scale relative to the n$^{th}$ bit, e.g., E1; for each group of bits, there are n slotted tracks on the corresponding disc and n+1 associated source-sensor pairs. In connection with the high-speed disc, the first group of n+1 bits (A1 through E1) represents $2^{n+1}$ disc positions, and the second group of n+1 bits (A2 through E2) represents $2^n$ disc positions. In connection with the medium-speed disc and the low-speed disc, which taken together, comprise low-speed disc means, there is another group of n+1 bits where n=4, e.g., A3 through E3. This group has n bits that follow a Gray code sequence shifted with respect to the bits on the high-speed disc and including as its lowest order bit, the shifted bit from the high-speed disc, i.e., E2. Bits A3 and B3 are generated in connection with the medium speed disc and bits C3, D3, and E3 are generated in connection with the low-speed disc. The discs are geared to each other for a $1:2^n$ speed reduction, i.e., 1:16, of the low-speed disc relative to the high-speed disc.

Figure 10:
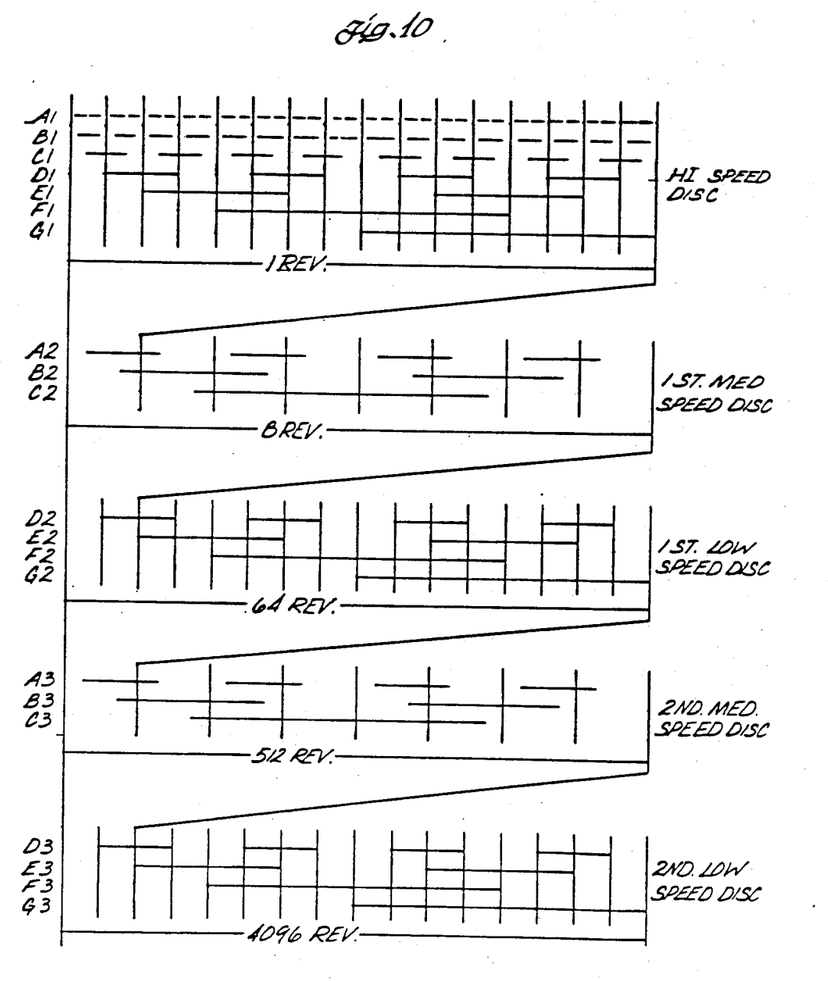
FIG. 10 is a diagram showing the relationship between the electrical signals generated by another embodiment of an encoder incorporating principles of the invention and the shaft positions expressed in natural binary code.

FIG. 10 represents another embodiment of an encoder incorporating principles of the invention. This encoder has a high-speed disc, a first medium-speed disc, a first low-speed disc, a second medium-speed disc, and a second low-speed disc. On the high-speed disc, the scale is one revolution relative to the input shaft divided into sixty-four units. On the first medium-speed disc, the scale is eight revolutions relative to the input shaft divided into eight units. On the first low-speed disc, the scale is sixty-four revolutions relative to the input shaft divided into eight units. On the second medium-speed disc, the scale is five hundred twelve revolutions relative to the input shaft divided into eight units. On the second low-speed disc, the scale is four thousand ninety-six revolutions relative to the input shaft divided into eight units. The data bits in connection with the high-speed disc are arranged into a group of n+1 bits, wherein n=6 that follow a Gray code sequence, e.g., A1 through F1 and an n+1$^{st}$ bit that is shifted one-quarter of scale relative to the n$^{th}$ bit, e.g., G1. In connection with the first medium-speed disc and the first low-speed disc, which taken together comprise first low-speed disc means, there is another group of n+1 bits, e.g., A2 through G2. This group also has n bits that follow a Gray code sequence shifted with respect to the bits on the high-speed disc and including as its lowest order bit, the shifted bit from the high-speed disc. Bits A2 through C2 are generated in connection with the first medium-speed disc and bits D2 through G2 are generated in connection with the first low-speed disc. The discs are geared to each other for a $1:2^n$ speed reduction, i.e., 1:64 of the first low-speed disc relative to the high-speed disc. Similarly, in connection with the second medium-speed disc and the second low-speed disc, which taken together comprise second low-speed disc means, there is another group of n+1 bits where n=6, e.g., A3 through G3. This group has n bits that follow a Gray code sequence shifted with respect to the bits on the first low-speed disc and including as its lowest order bit, the shifted bit from the first lowspeed disc. Bits A3 through C3 are generated in connection with the second medium-speed disc and bits D3 through G3 are generated in connection with the second low-speed disc. The second medium-speed disc and second low-speed disc are geared to the remaining discs for a $1:2^n$ speed reduction, i.e., 1:64 of the second low-speed disc relative to the first low-speed disc.

Figure 11:
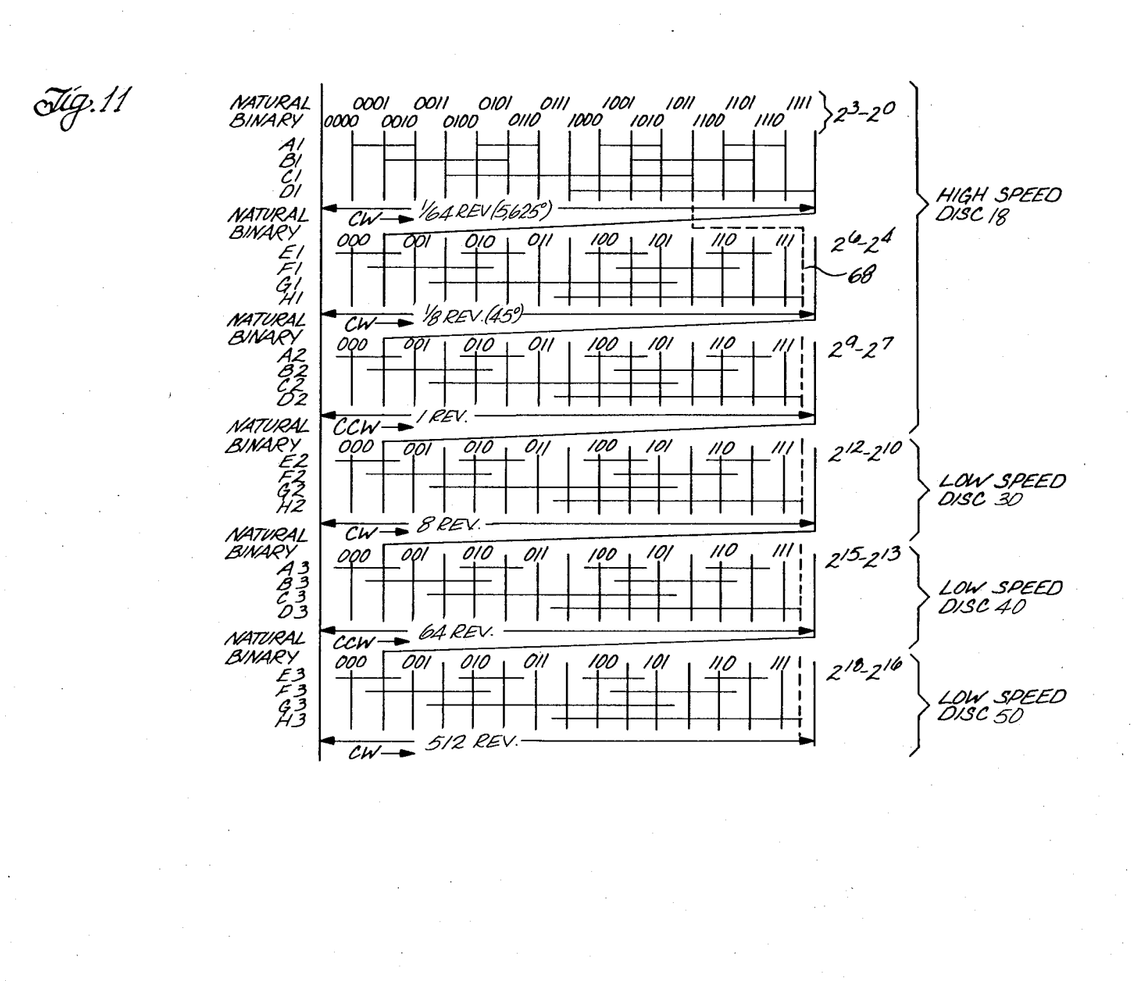
FIG. 11 is a diagram showing the relationship between the electrical signals generated by a modification of the encoder of FIG. 1 and the shaft positions expressed in natural binary code.

FIG. 11 represents a modification of the encoder represented in FIG. 7. Low-speed disc 60 is eliminated and one more group of n+1 bits is placed on high-speed disc 18. On disc 18 there are three scales—one scale is 1/64 of a revolution relative to the input shaft divided into 16 units, the second scale is ⅛ of a revolution relative to the input shaft divided into 8 units, and the third scale is 1 revolution relative to the input shaft divided into 8 units.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention.

What is claimed is:

1. A shaft position encoder comprising:
an input shaft;
a high-speed disc coupled to the input shaft;
at least one group of n concentric tracks on the high-speed disc, n being greater than one, each track comprising slotted openings that form alternating transparent and opaque sectors;
n+1 pairs of light sources and light sensors associated with each group of tracks, the light sources and light sensors being disposed on opposite sides of the high-speed disc in alignment with respective tracks such that two pairs are aligned with one of the tracks;
a low-speed disc means coupled to the input shaft with a speed reduction of $1:2^n$ relative to the high-speed disc;
a group of n concentric tracks on the low-speed disc means, each track comprising slotted openings that form alternating transparent and opaque sectors; and
n+1 pairs of light sources and light sensors associated with the group of tracks on the low-speed disc means, the sources and sensors being disposed on opposite sides of the low-speed disc means in alignment with the respective tracks such that two pairs are aligned with one of the tracks thereon.

2. The encoder of claim 1, in which the high-speed disc has two groups of n tracks thereon.

3. The encoder of claim 2, in which the low-speed disc means comprises a single disc.

4. The encoder of claim 3, in which n is three.

5. The encoder of claim 4, additionally comprising:

another low-speed disc coupled to the input shaft with a speed reduction of $1:2^n$ relative to the first named low-speed disc;

a group of n concentric tracks on the other low-speed disc, each track comprising slotted openings that form alternating transparent and opaque sectors; and n+1 pairs of light sources and light sensors associated with the group of tracks on the other low-speed disc, the sources and sensors being disposed on opposite sides of the other low-speed disc in alignment with the respective tracks such that two pairs are aligned with one of the tracks thereon.

6. The encoder of claim 5, in which each group of tracks and the corresponding source-sensor pairs are designed to produce in successive scales n bits of data representative of input shaft position in Gray code sequence and an $n+1^{st}$ bit shifted one-quarter of scale relative to the $n^{th}$ bit, the $n+1^{st}$ bit of each scale and the n bits of the succeeding scale being shifted the same amount so the bit shifting is cumulative from scale to scale.

7. The encoder of claim 6, in which the n bits of the succeeding scale are shifted in the opposite direction from the $n+1^{st}$ bit of each scale.

8. The encoder of claim 1, in which the high-speed disc has two groups of n tracks thereon, n is 4, the low-speed disc means comprises a medium-speed disc coupled to the input shaft with a speed reduction of 1:4 relative to the high-speed disc and a low-speed disc coupled to the input shaft with a speed reduction of 1:4 relative to the medium-speed disc, the medium-speed disc has two tracks, the low-speed disc has two tracks, two pairs of light sources and sensors are disposed on opposite sides of the medium speed disc, and three pairs of light sources and sensors are disposed on opposite sides of the low-speed disc.

9. The encoder of claim 8, in which each group of tracks and the corresponding source-sensor pairs are designed to produce in successive scales four bits of data representative of input shaft position in Gray code sequence and a fifth bit shifted one-quarter of scale relative to the fourth bit, the fifth bit of each scale and the four bits of the succeeding scale being shifted the same amount so the bit shifting is cumulative from scale to scale.

10. The encoder of claim 1, in which the high-speed disc has one group of tracks, n is 6, the low-speed disc means comprises a first medium-speed disc coupled to the input shaft with a gear speed reduction of 1:8 relative to the high-speed disc and a first low-speed disc coupled to the input shaft with a gear speed reduction of 1:8 relative to the medium speed disc, the first medium speed disc has three tracks, the first low-speed disc has three tracks, three pairs of light sources and sensors are disposed on opposite sides of the first medium-speed disc and four pairs of light sources and sensors are disposed on opposite sides of the first low-speed disc.

11. The encoder of claim 10, additionally comprising a second medium-speed disc coupled to the input shaft with a speed reduction of 1:8 relative to the first low-speed disc, a second low-speed disc coupled to the input shaft with a speed reduction of 1:8 relative to the second medium-speed disc, a group of three concentric tracks on the second medium-speed disc, each track comprising slotted openings that form alternating transparent and opaque sectors, a group of three concentric tracks on the second low-speed disc, each track comprising slotted openings that form alternating transparent and opaque sectors, three pairs of light sources and sensors associated with the tracks on the second medium-speed disc, the sources and sensors being disposed on opposite sides of the second medium-speed disc in alignment with the respective tracks, and four pairs of light sources and light sensors associated with the tracks on the second low-speed disc, the sources and sensors being disposed on opposite sides of the second low-speed disc in alignment with the respective track such that two pairs are aligned with one of the tracks thereon.

12. The encoder of claim 11, in which each group of tracks and the corresponding source-sensor pairs are designed to produce in successive scales six bits of data representative of input shaft position in Gray code sequence and a seventh bit shifted one-quarter of scale relative to the sixth bit, the seventh bit of each scale and the six bits of the succeeding scale being shifted the same amount so the bit shifting is cumulative from scale to scale.

13. A shaft position encoder comprising:
an input shaft;
a high-speed disc coupled to the input shaft;
low-speed disc means coupled to the input shaft with a speed reduction of $1:2^n$ relative to the high-speed disc, n being greater than one;
first means for generating at least one group of n+1 bits of binary data representative of the angular position of the high-speed disc as the input shaft rotates; and
second means for generating a group of n+1 bits of data representative of the angular position of the first low-speed disc means as the input shaft rotates.

14. The encoder of claim 13, in which the first generating means comprises means for generating two groups of n+1 bits of data, the scale of one group being $\frac{1}{2}^n$ of a revolution of the high-speed disc divided into $2^{n+1}$ units and the scale of the other group being one revolution of the high-speed disc divided into $2^n$ units.

15. The encoder of claim 14, in which each group has n bits of data representative of the angular position of the high-speed disc in Gray code sequence and an $n+1^{st}$ bit shifted one-quarter of scale relative to the $n^{th}$ bit, the $n+1^{st}$ bit of the $\frac{1}{2}^n$ revolution scale and the n bits of the one revolution scale being shifted the same amount relative to the n bits of the $\frac{1}{2}^n$ revolution scale.

16. The encoder of claim 15, in which the n bits of the one revolution scale are shifted in the opposite direction from the $n+1^{st}$ bit of the $\frac{1}{2}^n$ revolution scale.

17. The encoder of claim 15, in which the n bits of the one revolution scale are shifted downward in direction and the $n+1^{st}$ bit of the $\frac{1}{2}^n$ revolution scale is shifted upward in direction.

18. The encoder of claim 14, in which n is three.

19. The encoder of claim 14, in which n is four.

20. The encoder of claim 14, additionally comprising means for converting the data generated by the first and second generating means into 2n+1 bits of data in natural binary code.

21. The encoder of claim 13, additionally comprising means for converting the data generated by the generating means into fewer bits of data in natural binary code.

22. A shaft encoder comprising:
an input shaft;
a high-speed disc coupled to the input shaft;

first low-speed disc means coupled to the input shaft with a speed reduction relative to the high-speed disc;
second low-speed disc means coupled to the input shaft with a speed reduction relative to the first low-speed disc means;
means for generating at least one group of n+1 bits of binary data in a scale representative of the angular position of the high-speed disc as the input shaft rotates, n being greater than one;
means for generating a group of n+1 bits of data in a succeeding scale representative of the angular position of the first low-speed disc means as the input shaft rotates; and
means for generating a group of n+1 bits of data in a succeeding scale representative of the angular position of the second low-speed disc means as the input shaft rotates, each group of bits of data comprising n bits of data representative of input shaft position in unit distance code sequence and an $n+1^{st}$ bit shifted a fraction of scale relative to the $n^{th}$ bit, the $n+1^{st}$ bit of each scale and the n bits of the succeeding scale being shifted the same amount so the bit shifting is cumulative from scale to scale.

23. A shaft encoder comprising:
an input shaft;
a high-speed disc coupled to the input shaft;
low-speed disc means coupled to the input shaft with a speed reduction relative to the high-speed disc;
means for generating a first group of n+1 bits of binary data representative of the angular position of the high-speed disc as the input shaft rotates, n being greater than one, the scale of the first group being $\frac{1}{2}^n$ divided into $2^{n+1}$ units of the high-speed disc;
means for generating a second group of n+1 bits of data representative of the angular position of the high-speed disc as the input shaft rotates, the scale of the second group being one revolution of the high-speed disc divided into $2^n$ units; and
means for generating a group of bits of data representative of the angular position of the low-speed disc means as the input shaft rotates.

24. A shaft encoder comprising:
an input shaft;
a plurality of m discs coupled to the input shaft with successive speed reductions;
means for generating at least m groups of n+1 bits of binary data representative of the angular positions of the respective discs in unit distance code as the input shaft rotates, in being greater than one and the number of groups being greater than two; and
means for converting the data generated by the generating means into m·n+1 bits of data in natural binary code.

25. The encoder of claim 24, in which the generating means generates two groups of n+1 bits of data, representative of the angular position of the first disc in the succession, the scale of one group being $\frac{1}{2}^n$ divided into $2^{n+1}$ units of the shaft and the scale of the other group being one revolution of the shaft divided into $2^n$ units.

* * * * *